United States Patent
Salkintzis et al.

(10) Patent No.: US 12,101,633 B2
(45) Date of Patent: Sep. 24, 2024

(54) ENCRYPTED TRAFFIC DETECTION

(71) Applicant: Lenovo (Singapore) Pte. Ltd., New Tech Park (SG)

(72) Inventors: Apostolis Salkintzis, Athens (GR); Dimitrios Karampatsis, Ruislip (GB)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/315,451

(22) Filed: May 10, 2023

(65) Prior Publication Data

US 2023/0292130 A1 Sep. 14, 2023

Related U.S. Application Data

(63) Continuation of application No. 16/761,213, filed as application No. PCT/EP2018/053999 on Feb. 19, 2018, now Pat. No. 11,689,930.

(51) Int. Cl.
*H04W 12/108* (2021.01)
*H04L 9/40* (2022.01)
(Continued)

(52) U.S. Cl.
CPC ....... *H04W 12/108* (2021.01); *H04L 47/2441* (2013.01); *H04L 47/35* (2013.01);
(Continued)

(58) Field of Classification Search
CPC . H04L 47/2441; H04L 47/35; H04L 63/0428; H04L 63/0884; H04L 63/1408;
(Continued)

(56) References Cited

U.S. PATENT DOCUMENTS

2009/0307496 A1* 12/2009 Hahn ................. H04L 63/0428
380/272
2013/0136262 A1 5/2013 Shon
(Continued)

FOREIGN PATENT DOCUMENTS

EP 2053783 A1 4/2009

OTHER PUBLICATIONS

Motorola Mobility, Lenovo, "UE-based Solution for Encrypted Traffic Detection", SA WG2 Meeting #126 S2-182118, Feb. 26-Mar. 2, 2018, pp. 1-6.
(Continued)

*Primary Examiner* — Zhensheng Zhang
(74) *Attorney, Agent, or Firm* — Kunzler Bean & Adamson

(57) ABSTRACT

Apparatuses, methods, and systems are disclosed for associating the start of an encrypted data flow with an application. One apparatus includes a memory storing instructions executable by a processor to cause the apparatus to authenticate an encrypted traffic detection function ("ETDF") of the remote unit and to provide the remote unit with a list of application identifiers for which encrypted traffic detection information is to be provided, in response to successfully authenticating the ETDF of the remote unit. The instructions are executable by the processor to cause the apparatus to generate detection information for each application in the list of application identifiers and to send the list of application identifiers and the detection information for each application in the list of application identifiers to a network function in the mobile communication network.

20 Claims, 12 Drawing Sheets

(51) Int. Cl.
*H04L 47/2441* (2022.01)
*H04L 47/35* (2022.01)
*H04L 69/163* (2022.01)
*H04W 12/033* (2021.01)

(52) U.S. Cl.
CPC ...... *H04L 63/0428* (2013.01); *H04L 63/0884* (2013.01); *H04L 63/1408* (2013.01); *H04L 69/163* (2013.01); *H04W 12/033* (2021.01)

(58) Field of Classification Search
CPC .. H04L 69/163; H04W 12/033; H04W 12/108
See application file for complete search history.

(56) References Cited

U.S. PATENT DOCUMENTS

| | | |
|---|---|---|
| 2014/0369204 A1 | 12/2014 | Anand et al. |
| 2016/0183087 A1 | 6/2016 | Lehtinen et al. |
| 2017/0012978 A1 | 1/2017 | Lin et al. |
| 2017/0302703 A1 | 10/2017 | Buruganahalli et al. |
| 2017/0364794 A1 | 12/2017 | Mahkonen et al. |
| 2018/0351970 A1* | 12/2018 | Majumder ............ H04L 63/061 |
| 2020/0187106 A1* | 6/2020 | Salkintzis ............... H04W 4/60 |

OTHER PUBLICATIONS

3GPP, "3rd Generation Partnership Project; Technical Specification Group Services and System Aspects; Study on encrypted traffic detection and verification (Release 16)", 3GPP TR 23.787 V0.4.0, Jun. 2018, pp. 1-46.

3GPP, "3rd Generation Partnership Project; Technical Specification Group Services and System Aspects; System Architecture for the 5G System; Stage 2 (Release 15)", 3GPP TS 23.501 V15.0.0, Dec. 2017, pp. 1-181.

3GPP, "3rd Generation Partnership Project; Technical Specification Group Services and System Aspects; Procedures for the 5G System; Stage 2 (Release 15)", 3GPP TS 23.502 V15.0.0, Dec. 2017, pp. 1-258.

* cited by examiner

ENCRYPTED TRAFFIC DETECTION

FIELD

The subject matter disclosed herein relates generally to wireless communications and more particularly relates to associating the start of an encrypted data flow with an application.

BACKGROUND

In wireless communication systems, most of the traffic generated by mobile devices today is encrypted end-to-end, i.e., between mobile device (UE) and the remote server. This enables communication privacy and protects sensitive information from being captured by malicious third parties.

However, the end-to-end encryption of traffic prevents mobile network operators from accurately detecting the type of traffic exchanged between mobile devices and remote servers and, thus, makes it difficult to apply service-specific policies to such traffic. For example, a network operator may need to charge differently the video streaming traffic exchanged with a specific remote server. If the network operator cannot accurately detect which traffic is video streaming traffic exchanged the specific remote server, this charging policy cannot be applied.

In an attempt to overcome this problem, mobile network operators have deployed deep-packet-inspection equipment which attempt to determine the service associated with each encrypted flow by analyzing the pattern of the flow and leveraging header information that is not encrypted. However, such detection means have been proven unreliable and can detect only a limited range of services/applications. Moreover, with the wider application of more powerful end-to-end security protocols (such as Transport Layer Security ("TLS") version 1.3) the detection of encrypted traffic with deep packet inspection has become even more difficult.

BRIEF SUMMARY

Methods for associating the start of an encrypted data flow with an application are disclosed. Apparatuses and systems also perform the functions of the methods. One method (e.g., of a user equipment ("UE")) for associating the start of an encrypted data flow with an application includes performing an authentication of a UE with a network encrypted traffic detection function ("NW-ETDF"), detecting a data packet generated by a first application running on the remote unit, and determining, by the UE, whether the data packet is associated with the start of an encrypted data flow for the first application. The method includes modifying, by the UE, the data packet to include detection information and transmitting the modified data packet to a mobile communication network. The method may further include identifying one or more additional data packets belonging to the data flow, wherein the one or more additional data packets are sent without the detection information.

Another method (e.g., of a NW-ETDF) for associating the start of an encrypted data flow with an application includes authenticating an encrypted traffic detection function ("ETDF") of a remote unit operating in a mobile communication network, providing the remote unit with a list of application identifiers for which encrypted traffic detection information is to be provided, generating detection information for each application in the list of application identifiers, and sending the list of application identifiers and the detection information for each application in the list of application identifiers to a network function in the mobile communication network, in response to successfully authenticating the ETDF of the remote unit.

Here, the detection information may include an application key unique to each application, wherein generating detection information for each application in the list of application identifiers comprises hashing an application identifier of each application with an encrypted traffic detection key. The encrypted traffic detection key may be generated after a successful authentication of the ETDF of the remote unit.

Another method (e.g., of a network function, such as a user plane function) for associating the start of an encrypted data flow with an application includes receiving a list of application identifiers and detection information for each application in the list of application identifiers from a network function and receiving a first data packet from a remote unit, the data packet including first detection information. The method further includes identifying an application from the list of application identifiers using the detection information and applying a first traffic rule to the first data packet, where the first traffic rule is selected based on the identified application.

In certain embodiments, the method includes receiving a plurality of traffic rules from the network function, each traffic rule being associated with one or more applications. In such embodiments, applying the first traffic rule to the first data packet includes selecting a traffic rule associated with the identified application and applying the selected traffic rule to the first data packet. In certain embodiments, the method includes receiving a second data packet from the remote unit, the second data packet having an encrypted payload, determining that the second data packet does not include detection information, associating the second data packet with the first data packet, and applying the first traffic rule to the second data packet.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
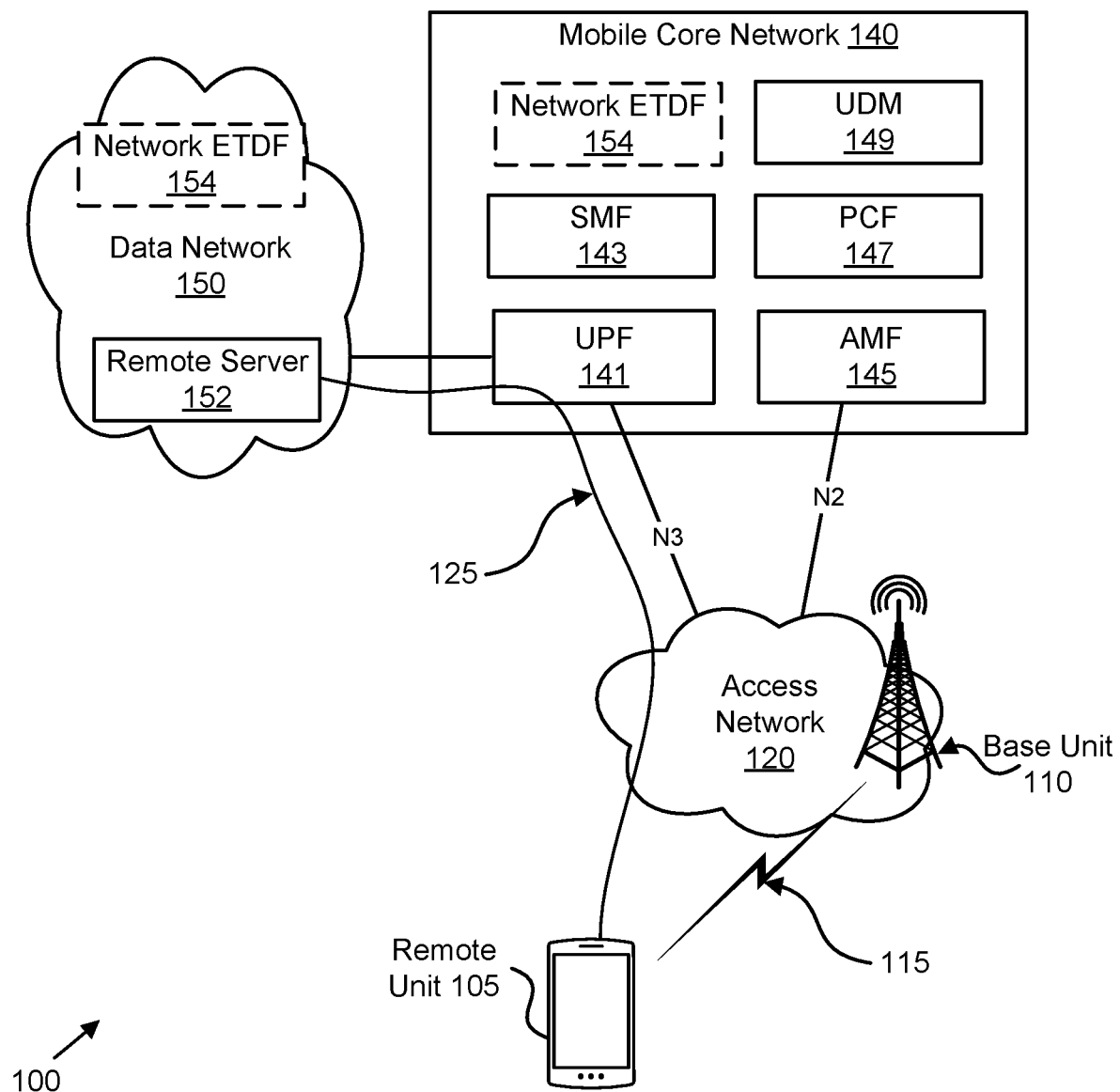
FIG. 1 is a schematic block diagram illustrating one embodiment of a wireless communication system for associating the start of an encrypted data flow with an application.

FIG. 1 depicts a wireless communication system 100 for associating the start of an encrypted data flow with an application, according to embodiments of the disclosure. In one embodiment, the wireless communication system 100 includes at least one remote unit 105, an access network 120 containing at least one base unit 110, wireless communication links 115, and a mobile core network 140. Even though a specific number of remote units 105, access networks 120, base units 110, wireless communication links 115, and mobile core networks 140 are depicted in FIG. 1, one of skill in the art will recognize that any number of remote units 105, access networks 120, base units 110, wireless communication links 115, and mobile core networks 140 may be included in the wireless communication system 100. In another embodiment, the access network 120 contains one or more Wireless Local Area Network ("WLAN") access points (e.g., Wi-Fi™ access points).

In one implementation, the wireless communication system 100 is compliant with the Fifth Generation ("5G") system specified in the Third Generation Partnership Project ("3GPP") specifications. More generally, however, the wireless communication system 100 may implement some other open or proprietary communication network, for example, Long-Term Evolution ("LTE") or Worldwide Interoperability for Microwave Access ("WiMAX"), among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 may communicate with a remote server 152 via a data path 125 that passes through the mobile core network 140 and a data network 150. For example, a remote unit 105 may establish a PDU connection (or a data connection) to the data network 150 via the mobile core network 140 and the access network 120. The mobile core network 140 then relays traffic between the remote unit 105 and the remote server 152 using the PDU connection to the data network 150.

The base units 110 may be distributed over a geographic region. In certain embodiments, a base unit 110 may also be referred to as an access terminal, an access point, a base, a base station, a Node-B, an Evolved Node-B ("eNB"), a 5G Node-B ("gNB"), a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 140 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a data network 150, like the Internet and private data networks, among other data networks. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple control plane functions including, but not limited to, an Access and Mobility Management Function ("AMF") 145, a Session Management Function ("SMF") 143, and a Policy Control Function ("PCF") 147. Additionally, the mobile core network 140 includes a user plane function ("UPF") 141 and a Unified Data Management ("UDM") 149. Although specific numbers and types of network functions are depicted in FIG. 1, one of skill in the art will recognize that any number and type of network functions may be included in the mobile core network 140.

To detect the start of an encrypted data flow and associate the encrypted traffic with an application, the wireless communication system 100 includes a NW-ETDF 154. The NW-ETDF 154 verifies the authenticity of a ETDF in the remote unit 105. This authenticity verification is very important because the network must trust that the remote unit 105 is providing the right "encrypted traffic detection information." In some scenarios, a malicious remote unit 105 may provide fake detection information, e.g., it may fraudulently indicate that an encrypted data flow is originated by App-X although the data flow is really originated by App-Y. The purpose of ETDF authenticity verification is to confirm that the ETDF in the remote unit 105 is trusted and that it provides rightful detection information to the network. When the ETDF authenticity verification fails, the network cannot trust the remote unit 105 providing the right detection information and it make enforce various policies for such remote units 105 (e.g., block all encrypted traffic of the untrusted remote units 105).

Additionally, the NW-ETDF 154 provides to the remote unit 105 a list of applications for which "encrypted traffic detection information" is to be provided to the network. This list of applications may be pre-configured by the operator in the NW-ETDF 154. In one embodiment, the list of applications is the same for all remote units 105. In another embodiment, the list of applications is specific to a remote unit 105.

The NW-ETDF 154 also creates detection information (e.g., an Application Key "AppKey" discussed below) for each application of which encrypted traffic should be detected. Moreover, the NW-ETDF 154 provides to the PCF 147 a list of applications and the AppKey corresponding to each application. This list is then transferred to an anchor UPF 141 (via SMF 143) and is used by UPF 141 to determine the application associated to an encrypted data flow. After that, the UPF 141 may apply the installed Policy and Charging Control ("PCC") rule(s) for this application.

The NW-ETDF 154 can communicate with the remote unit 105 by using either the control plane (i.e., Non-Access Stratum ("NAS") transport) or by using the user plane (i.e., internet protocol ("IP") transport). In the depicted embodiment, the NW-ETDF 154 is located in the data network 150. Here, the NW-ETDF 154 may communicate with the remote unit 105 over the user plane. However, in other embodiments the NW-ETDF 154 is located in the mobile core network 140. For example, the NW-ETDF 154 may be co-located with the PCF 147. When a part of the mobile core network 140, the NW-ETDF 154 may communicate with the remote unit 105 over the control plane.

The remote unit 105 implements ETDF to detect encrypted flows initiated by applications executing on the remote unit 105. For specific detected flows, the remote unit 105 provides "encrypted traffic detection information" (such as the Application Key discussed below) to the mobile core network 140. As a preliminary step, an ETDF authentication takes place which confirms that the ETDF in the remote unit 105 is authentic and can be trusted. This is an important step that establishes a trust relationship between the remote unit 105 and the mobile core network 140 for the purposes of encrypted traffic detection. Without this step the mobile core network 140 cannot trust the "encrypted traffic detection information" provided by the remote unit 105.

The remote unit 105 modifies a first packet of the detected encrypted flow (e.g., a Transmission Control Protocol ("TCP") Synchronize ("SYN") packet) by adding the "encrypted traffic detection information" associated with the application that sends this packet and sending the modified data packet to the network. The UPF 141 anchor in the mobile core network 140 receives the packet with the "encrypted traffic detection information" and associates this packet and all subsequent packet of the same data flow with a certain application. Then, the UPF 141 may apply the PCC rule(s) associated with this application.

Figure 2A:
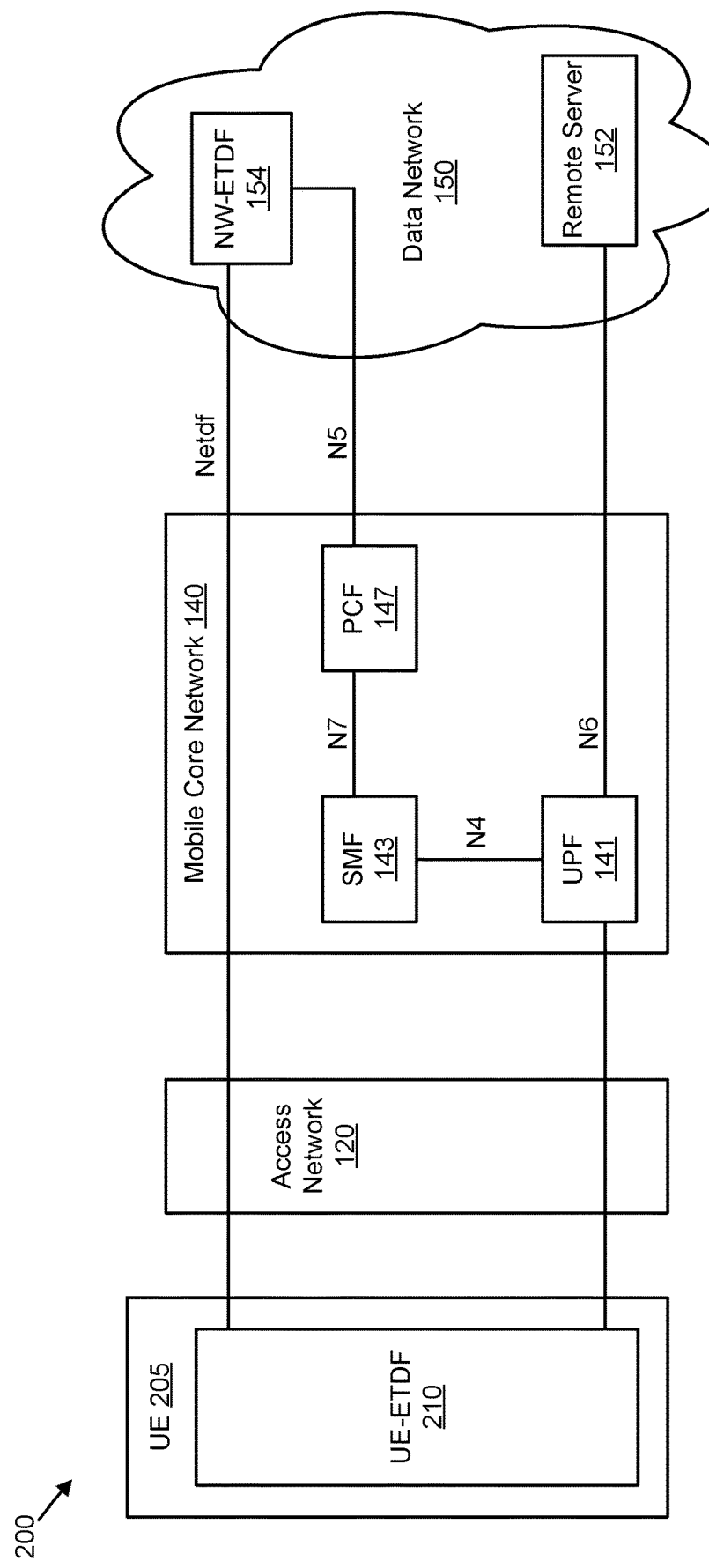
FIG. 2A is a block diagram illustrating one embodiment of a network architecture for associating the start of an encrypted data flow with an application.

FIG. 2A depicts a network architecture 200 used for associating the start of an encrypted data flow with an application, according to embodiments of the disclosure. The network architecture 200 may be a simplified embodiment of the wireless communication system 100. As depicted, the network architecture 200 includes a UE 205 that communicates with the mobile core network 140 via the access network 120. Via the mobile core network, the UE 205 connects to the remote server 152 in the data network 150. The UE 205 also has a connection to the NW-ETDF 154, depicted here are being located in the data network 150. The UE 205 may be one embodiment of the remote unit 105 described above.

As depicted, there is an Encrypted Traffic Detection Function in the UE (denoted "UE-ETDF") 210 and an Encrypted Traffic Detection Function in the data network 150 (e.g., NW-ETDF 154). The UE-ETDF 210 can communicate with the NW-ETDF 154 by using either the control plane (i.e., NAS transport) or by using the user plane (i.e., IP transport). In various embodiments, the UE-ETDF 210 and the NW-ETDF 154 communicate over a new interface "Netdf."

In an alternative embodiment, the NW-ETDF 154 may reside in the mobile core network 140. The exact location of the NW-ETDF 154 may depend on whether the communication between the UE-ETDF 210 and the NW-ETDF 154 takes place over the control plane (the NW-ETDF 154 resides in the mobile core network 140 in such cases), or whether it takes place over the user plane (the NW-ETDF 154 resides in a data network 150 in such cases).

The UE-ETDF 210 detects when a new encrypted data flow is initiated in the UE (e.g. by detecting TCP SYN packets to port '443') and determines the UE application that initiated the encrypted data flow. In various embodiments, the UE-ETDF 210 piggybacks an application key in the first packet of an encrypted data flow. The application key is then used by the UPF 141 to determine the application that initiated the encrypted data flow. As discussed in further detail below, the application key is an efficient form of encrypted traffic detection information provided by the UE to the mobile core network 140.

Figure 2B:
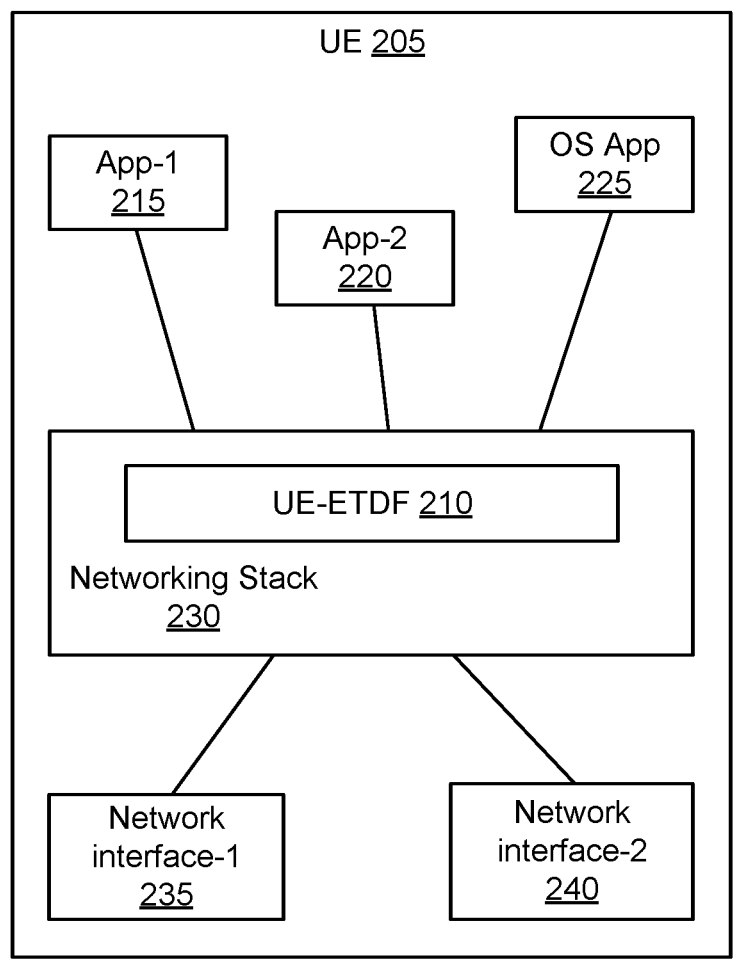
FIG. 2B is a block diagram illustrating one embodiment of an encrypted traffic detection function in a UE.

The UE-ETDF 210 must be able to intercept the user-plane traffic in the UE 205 in order to detect when a new encrypted data flow is initiated. In an example implementation the UE-ETDF 210 could be part of the networking stack in the UE, as shown in FIG. 2B. However, other alternative implementations are within the scope of the disclosure.

FIG. 2B depicts a UE-ETDF 210 in the UE 205, according to embodiments of the disclosure. Here, the UE-ETDF 210 is a part of the networking stack 230 of the UE 205. As such, the UE-ETDF 210 has access to the user-plane traffic in the UE 205, including data packets generates by the applications running on the UE 205. As depicted, the UE 205 includes a first user application ("App-1") 215, a second user application ("App-2") 220, and an operating system application ("OS App") 225, each capable of initiating an encrypted data flow. As will be understood, the UE 205 may run more or fewer applications, however only three are shown. The UE 205 also includes a first network interface ("Network interface-1") 235 and a second network interface ("Network interface-2") 240 through which the user-plane traffic may pass.

Figure 3:
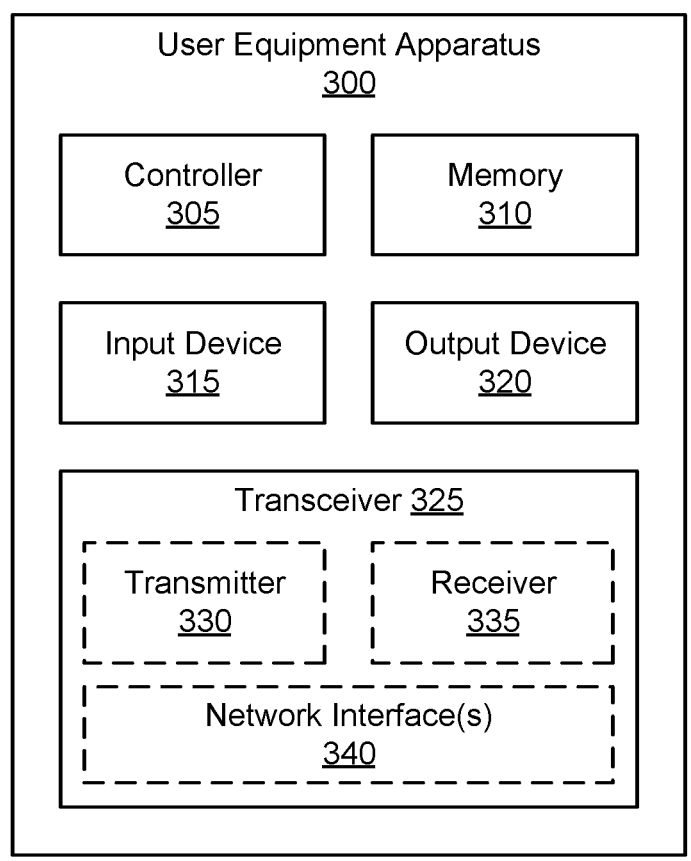
FIG. 3 is a schematic block diagram illustrating one embodiment of a UE apparatus for associating the start of an encrypted data flow with an application.

FIG. 3 depicts one embodiment of a UE apparatus 300 that may be used for associating the start of an encrypted data flow with an application, according to embodiments of the disclosure. The UE apparatus 300 may be one embodiment of the SMF 143. Furthermore, the UE apparatus 300 may include a processor 305, a memory 310, an input device 315, a display 320, and a transceiver 325. In some embodiments, the input device 315 and the display 320 are combined into a single device, such as a touch screen. In certain embodiments, the UE apparatus 300 may not include any input device 315 and/or display 320.

As depicted, the transceiver 325 includes at least one transmitter 330 and at least one receiver 335. Additionally, the transceiver 325 may support at least one network interface 340. Here, the at least one network interface 340 facilitates communication with a eNB or gNB (e.g., using the Uu interface). Additionally, the at least one network interface 340 may include an interface used for communications with an UPF and a NW-ETDF.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the processor 305 performs an authentication with a NW-ETDF. Here, the NW-ETDF verifies that a UE-ETDF in the UE apparatus 300 is authentic. In some embodiments, the processor 305 creates an encrypted traffic detection key upon successful authentication.

The processor 305 detects a data packet generated by a first application. Here, the first application may be a user application or may be an operating system ("OS") application. Moreover, the processor 305 determines whether the data packet is associated with the start of an encrypted data flow for the first application.

In certain embodiments, determining whether the data packet is associated with the start of an encrypted data flow includes the processor 305 determining whether an application identifier of the first application is included in a list of application identifiers for which encrypted traffic detection information is to be provided. In one embodiment, the list of application identifiers may be received from the NW-ETDF. In another embodiment, the list of application identifiers may be received from the mobile core network 140, e.g., from the PCF 147.

In response to the application identifier of the first application being included in the list of application identifiers, the processor 305 identifies a packet type for the detected data packet. Note that certain data packet types are associated with the start of an encrypted data flow. For example, the at least one packet type associated with an encrypted data flow may be one of: a Transmission Control Protocol Synchronize ("TCP SYN") packet with destination port of '443,' a Transport Layer Security protocol ("TLS") "ClientHello" packet, and a User Datagram Protocol ("UDP") packet to port '80,' or other combination of protocol and specific destination port, or other specific packet. The processor 305 determines whether the packet type matches at least one packet type associated with an encrypted data flow in order to determine whether the data packet is associated with the start of an encrypted data flow.

In response to determining that the data packet is associated with the start of an encrypted data flow, the processor 305 modifies the data packet to include detection information. Here, the detection application may be an application key created from the application identifier and the encrypted traffic detection key. For example, the application key may be created using a hash function with the application identifier and the encrypted traffic detection key being inputs to the hash function. In certain embodiments, the processor 305 generates an application key for each application identifier in the list of application identifiers.

The detection information (e.g., application key) may be placed in a header of the data packet. In one embodiment, an extension header is used which contains the detection information (e.g., application key). In other embodiments, the detection information is added to the data packet by encapsulating the data packet. Adding the detection information to the data packet is discussed in further detail below, with reference to FIG. 6.

Moreover, the processor 305 controls the transceiver 325 to send the modified data packet to the mobile communication network (e.g., to the access network 120 and mobile core network 140). As discussed in further detail below, the processor 305 may further identify one or more additional data packets belonging to the data flow. Here, the one or more additional data packets are sent without the detection information.

The memory 310, in one embodiment, is a computer readable storage medium. In some embodiments, the memory 310 includes volatile computer storage media. For example, the memory 310 may include a Random Access Memory ("RAM"), including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data relating to associating the start of an encrypted data flow with an application, for example storing application lists, detection information, application keys, an encrypted traffic detection key, and the like. In certain embodiments, the memory 310 also stores program code and related data, such as an operating system or other controller algorithms operating on the UE apparatus 300 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, a liquid crystal display ("LCD"), a light-emitting diode ("LED") display, an organic LED ("OLED") display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

The transceiver 325 communicates with one or more network functions of a mobile communication network. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335.

Figure 4:
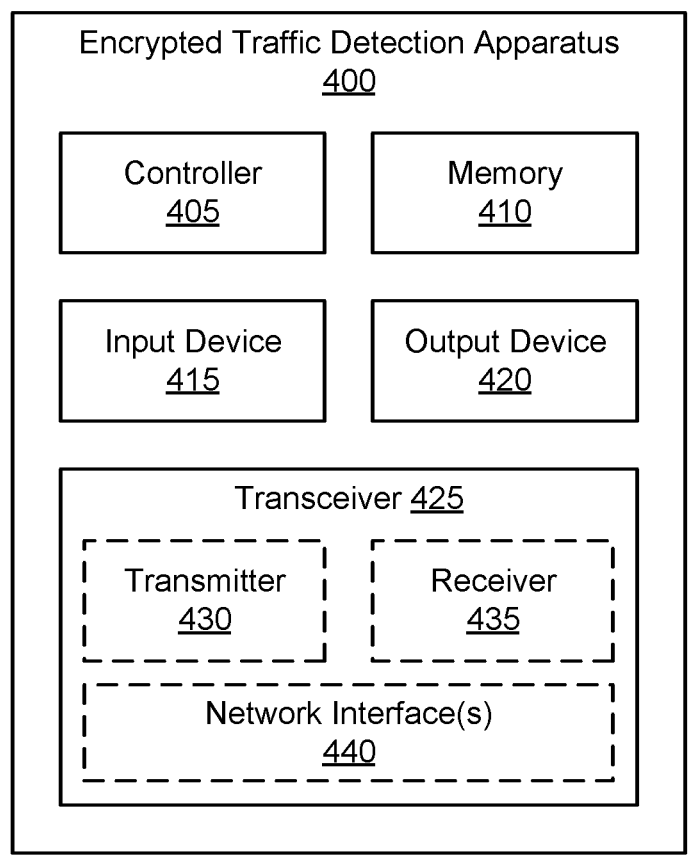
FIG. 4 is a schematic block diagram illustrating one embodiment of an encrypted traffic detection apparatus for associating the start of an encrypted data flow with an application.

FIG. 4 depicts one embodiment of an encrypted traffic detection apparatus 400 that may be used for associating the start of an encrypted data flow with an application, according to embodiments of the disclosure. The encrypted traffic detection apparatus 400 may be one embodiment of the SMF 143. Furthermore, the encrypted traffic detection apparatus 400 may include a processor 405, a memory 410, an input device 415, a display 420, and a transceiver 425. In some embodiments, the input device 415 and the display 420 are combined into a single device, such as a touch screen. In certain embodiments, the encrypted traffic detection apparatus 400 may not include any input device 415 and/or display 420.

As depicted, the transceiver 425 includes at least one transmitter 430 and at least one receiver 435. Additionally, the transceiver 425 may support at least one network interface 440. Here, the at least one network interface 440 facilitates communication with a remote unit 105, such as the UE 205, with other network functions in a mobile core network 140, such as the PCF 147.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the processor 405 authenticates an encrypted traffic detection function ("ETDF") of the remote unit (e.g., the UE-ETDF 210). Here, the processor 405 verifies the authenticity of the UE-ETDF. Moreover, the processor 405 creates a common encrypted traffic detection key, e.g., after a successful authentication of the ETDF of the remote unit.

The processor 405 provides the remote unit (e.g., the UE 205) with a list of application identifiers for which encrypted traffic detection information is to be provided. Additionally, the processor 405 generates detection information for each application in the list of application identifiers. Having generated the detection information, the processor 405 sends the list of application identifiers and the detection information for each application in the list of application identifiers to a network function in the mobile communication network, such as the PCF 147.

In some embodiments, the detection information comprises an application key unique to each application. Here, the processor generates an application key for each application in the list of application identifiers based on an application identifier of each application and on the encrypted traffic detection key. For example, a hash function may be used to generate the application key from the application identifier and the encrypted traffic detection key.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to associating the start of an encrypted data flow with an application, for example storing a list of application identifiers and corresponding detection information, an encrypted traffic detection key, and the like. In certain embodiments, the memory 410 also stores program code and related data, such as an operating system or other controller algorithms operating on the encrypted traffic detection apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with a remote unit (e.g., a UE 205) and at least one or more network functions of a mobile communication network (e.g., the PCF 147). The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435.

Figure 5:
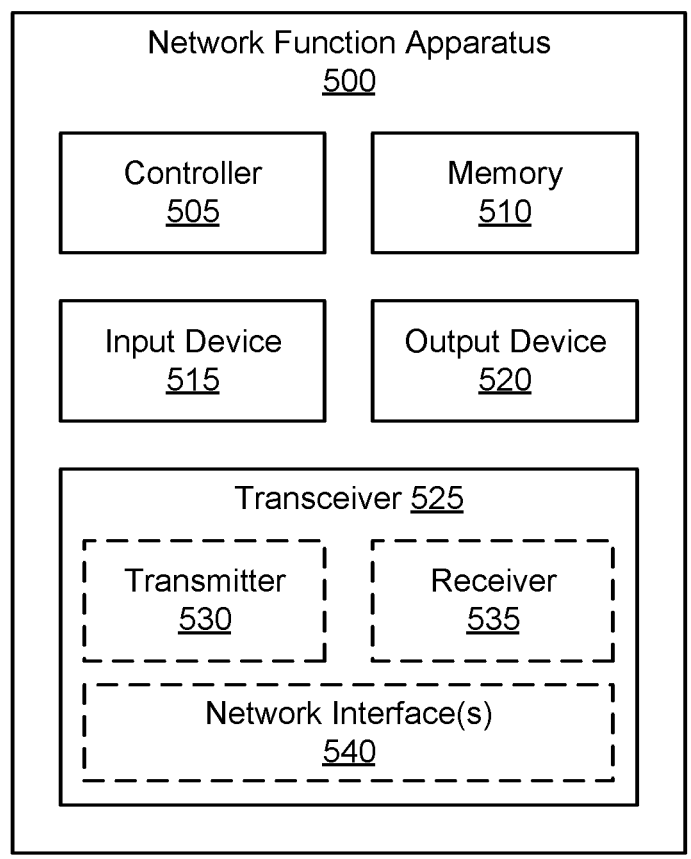
FIG. 5 is a schematic block diagram illustrating one embodiment of a network function apparatus for associating the start of an encrypted data flow with an application.

FIG. 5 depicts one embodiment of a network function apparatus 500 that may be used for associating the start of an encrypted data flow with an application, according to embodiments of the disclosure. The network function apparatus 500 may be one embodiment of the SMF 143. Furthermore, the network function apparatus 500 may include a processor 505, a memory 510, an input device 515, a display 520, and a transceiver 525. In some embodiments, the input device 515 and the display 520 are combined into a single device, such as a touch screen. In certain embodiments, the network function apparatus 500 may not include any input device 515 and/or display 520.

As depicted, the transceiver 525 includes at least one transmitter 530 and at least one receiver 535. Additionally, the transceiver 525 may support at least one network interface 540. Here, the at least one network interface 540 facilitates communication with a remote unit 105, such as the UE 205, with other network functions in a mobile core network 140, such as the SMF 143, and also with a remote host or server in the data network 150.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the display 520, and the transceiver 525.

In some embodiments, the processor 505 receives a list of application identifiers and detection information for each application in the list of application identifiers from a network function. Here, the list of application identifiers are UE-run applications for which encrypted traffic detection is desired. Moreover, the detection information for each application may be an Application Key ("AppKey") as discussed herein. Note that the various identifiers in the list of application identifiers may be different lengths. In various embodiments, however, the AppKeys (e.g., detection information) are a consistent length. In certain embodiments, the processor 505 receives the list of application identifiers and corresponding detection information from a SMF 143 in the mobile core network 140.

Additionally, the processor 505 receives a first data packet from a remote unit, such as the remote unit 105 or the UE 205 described above. Here, the first data packet includes first detection information. In various embodiments, the first detection information is an AppKey. The processor 505 identifies an application from the list of application identifiers using the detection information (e.g., using the AppKey).

The processor 505 then applies a first traffic rule to the first data packet. Here, the first traffic rule is selected based on the identified application. For example, the first traffic rule may instruct the network function apparatus 500 to forward the first data packet. As another example, the first traffic rule may instruct the network function apparatus 500 to drop the first data packet. Each traffic rule is associated with one or more applications.

In certain embodiments, the processor 505 receives a list of traffic rules, e.g., from the SMF 143. Here, the processor 505 applies the first traffic rule to the first data packet by selecting a traffic rule associated with the identified application and applying the selected traffic rule to the first data packet. In one embodiment, the list of traffic rules is received with the list of application identifiers and corresponding detection information. In another embodiment, the list of traffic rules is received separately from the list of application identifiers and corresponding detection information. In further embodiments, the processor 505 may receive an updated list of traffic rules from the SMF 143.

Moreover, the processor 505 may receive a second data packet from the remote unit, the second data packet having an encrypted payload. In such embodiments, the processor 505 determines whether the second data packet includes detection information. Note that the UE 205 includes detection information with a data packet associated with the start of an encrypted traffic flow. In response to the second data packet not including detection information, the processor 505 may associate the second data packet with the first data packet. Note that data packets are determined to be associated with one another when the share the same 5-tuple (i.e., destination address, source address, destination port, source port, and protocol type) in the header. In response to associating the second data packet with the first data packet, the processor 505 applies the first traffic rule to the second data packet. Moreover, any subsequent data packets sharing the same 5-tuple as the first data packet will also belong to the same (encrypted) traffic flow and the processor 505 will apply the first traffic rule to these subsequent data packets as well.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data relating to associating the start of an encrypted data flow with an application, for example storing a list of traffic rules, a list of application identifiers and corresponding detection information, data flow information, and the like. In certain embodiments, the memory 510 also stores program code and related data, such as an operating system or other controller algorithms operating on the network function apparatus 500 and one or more software applications.

The input device 515, in one embodiment, may include any known computer input device including a touch panel, a button, a keyboard, a stylus, a microphone, or the like. In some embodiments, the input device 515 may be integrated with the display 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The display 520, in one embodiment, may include any known electronically controllable display or display device. The display 520 may be designed to output visual, audible, and/or haptic signals. In some embodiments, the display 520 includes an electronic display capable of outputting visual data to a user. For example, the display 520 may include, but is not limited to, an LCD display, an LED display, an OLED display, a projector, or similar display device capable of outputting images, text, or the like to a user. As another, non-limiting, example, the display 520 may include a wearable display such as a smart watch, smart glasses, a heads-up display, or the like. Further, the display 520 may be a component of a smart phone, a personal digital assistant, a television, a table computer, a notebook (laptop) computer, a personal computer, a vehicle dashboard, or the like.

In certain embodiments, the display 520 includes one or more speakers for producing sound. For example, the display 520 may produce an audible alert or notification (e.g., a beep or chime). In some embodiments, the display 520 includes one or more haptic devices for producing vibrations, motion, or other haptic feedback. In some embodiments, all or portions of the display 520 may be integrated with the input device 515. For example, the input device 515 and display 520 may form a touchscreen or similar touch-sensitive display. In other embodiments, the display 520 may be located near the input device 515.

The transceiver 525 communicates with a remote unit (e.g., a UE 205), one or more network functions of a mobile communication network (e.g., the SMF 143), and a remote data network (e.g., the remote server 152 in the data network 150). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages. The transceiver 525 may include one or more transmitters 530 and one or more receivers 535.

Figure 6:
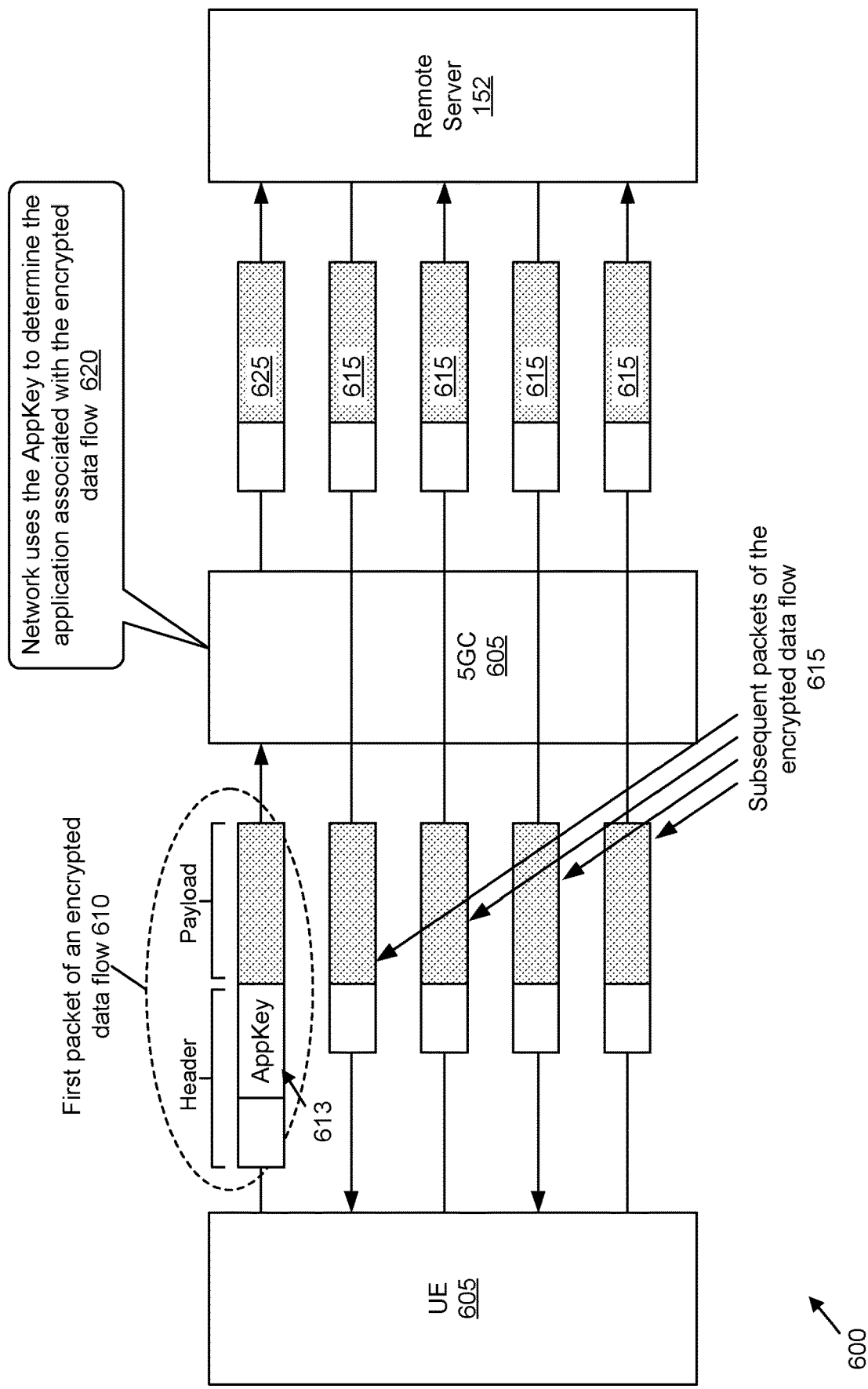
FIG. 6 is a block diagram illustrating one embodiment of identifying an encrypted traffic flow.

FIG. 6 depicts diagram 600 of an UE 205 identifying an encrypted traffic flow and providing encrypted traffic detection information to the network, here a 5GC 605. Here, the UE 205 includes a UE-ETDF 210 (not shown). Here, the UE 205 includes an AppKey 613 in the first packet 610 of an encrypted data flow. The first packet 610 of an encrypted data flow may be, e.g., a TCP SYN packet to port '443,' a TLS 'ClientHello' packet, a UDP packet to port '80' (e.g., QUIC protocol), etc. When the UE-ETDF 210 detects the first packet 610 that initiates an encrypted data flow, it determines the application that triggered this packet and then piggybacks to this first packet the AppKey 613 corresponding to this application.

As depicted, the AppKey 613 is piggybacked only to the first packet 610 of an encrypted data flow. The subsequent packets 615 of the encrypted data flow do not carry the AppKey 613 or any other additional information. The 5GC 605 uses the AppKey 613 in the first packet 610 of an encrypted data flow to associate this data flow with the application that corresponds to this AppKey 613 (see block 620).

The AppKey 613 can be piggybacked in the first packet 610 of an encrypted data flow with various mechanisms. For example, when the UE 205 uses IPv6 communication, the AppKey 613 may be included in a new IPv6 Extension Header. As another example, when the UE 205 uses IPv4 communication, the AppKey 613 may be included by using a new Protocol Type value. In one embodiment, the AppKey 613 may be included in the TCP header, e.g., by using a new TCP Option. In another embodiment, the AppKey 613 may be included in the TLS header, e.g. by using a new TLS Extension Type. In other embodiments, first packet 610 may be encapsulated within GRE ("Generic Routing Encapsulation") and use the AppKey 613 as a GRE Key. The 5GC 605 (e.g., the UPF 141) strips the AppKey 613 from the first packet 610 before routing the de-piggybacked packet 625 to the remote server 152.

Figure 7:
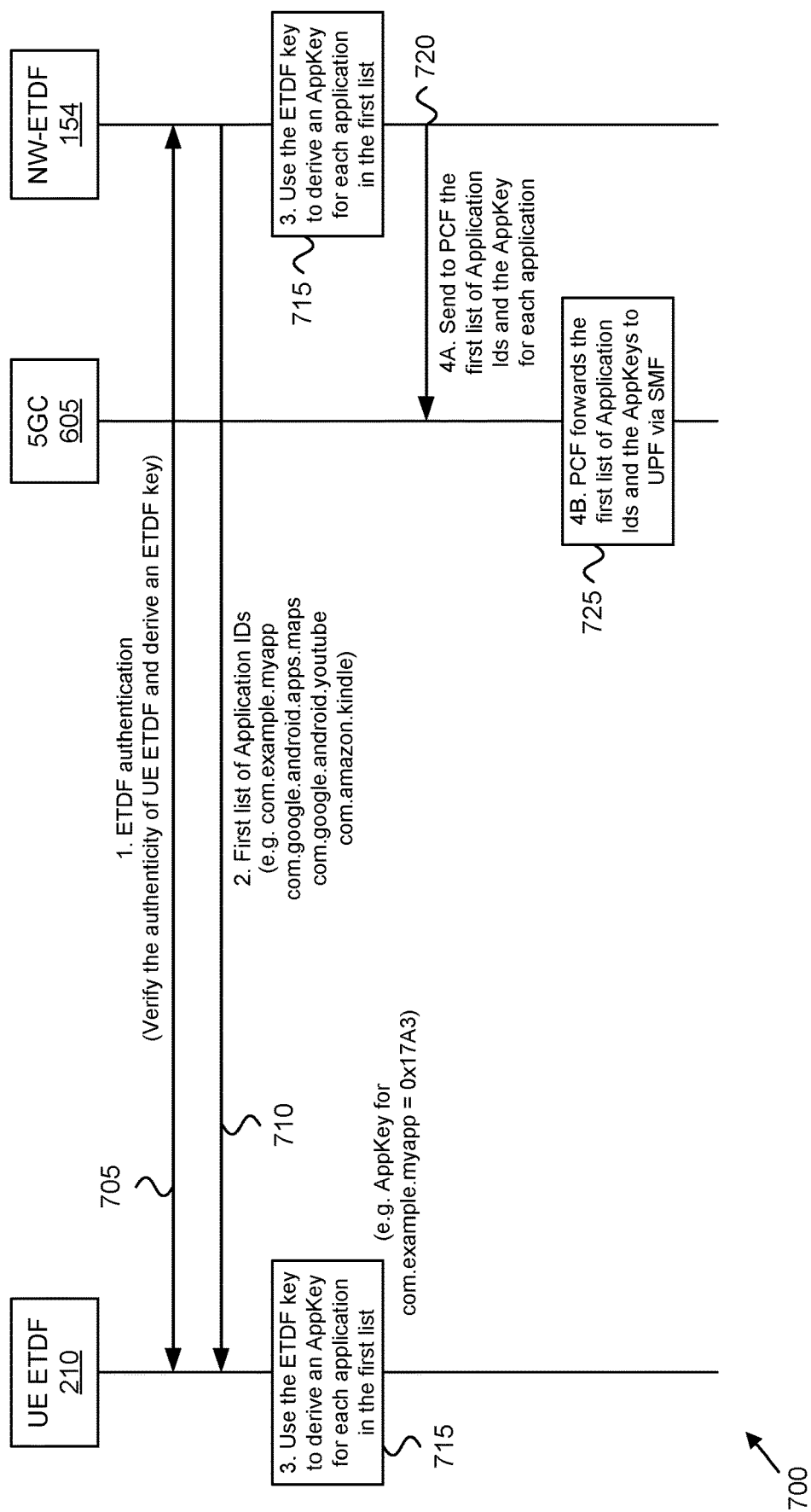
FIG. 7 is a block diagram illustrating one embodiment of a procedure for encrypted traffic detection function authentication and provisioning.

FIG. 7 depicts a network procedure 700 for encrypted traffic detection function authentication and provisioning, according to embodiments of the disclosure. Before the 5GC can reliably detect the applications associated with encrypted data flows, the ETDF Authentication and Provisioning procedure must take place. The network procedure 700 involves the UE-ETDF 210, the 5GC 605, and the NW-ETDF 154. While depicted as separate from (e.g., external to) the 5GC 605, in other embodiments the procedure is performed with the NW-ETDF 154 being located within the 5GC 605. Note that the UE-ETDF 210 is a part of the UE 205 (not shown).

The network procedure 700 begins as the UE-ETDF 210 and the NW-ETDF 154 perform an ETDF authentication procedure (see messaging 705). After the UE 205 registers to the 5GC 605 and after it establishes a Protocol Data Unit ("PDU") session (i.e., a data connection of the "PDU session" type), the UE-ETDF 210 sends a request to the NW-ETDF 154 to initiate the ETDF authentication. In one embodiment, communication between the UE-ETDF 210 and the NW-ETDF 154 takes place over the control plane (e.g. by using NAS transport). In another embodiment, communication between the UE-ETDF 210 and the NW-ETDF 154 takes place over the user plane (e.g., by using IPv6 transport).

In one embodiment, the UE-ETDF 210 starts the ETDF authentication procedure after the UE 205 receives a PDU Session Establishment Accept message (after the establishment of a PDU session) which contains a special indication. This indication could be a new ETDF flag or the address of the NW-ETDF 154, and could be inserted by the network (e.g., by the 5GC 605) only when the UE 205 is to provide "encrypted traffic detection information" for the encrypted traffic exchanged over this PDU session.

In an alternative embodiment, the ETDF authentication may be executed, not after, but during the establishment of a PDU session. In such embodiments, the ETDF authentication may follow a "secondary authorization/authentication" procedure, for example as specified in 3GPP Technical Specification ("TS") 23.502, clause 4.3.2.3. In this case, the NW-ETDF 154 would take the role of a Data Network-Authentication, Authorization & Accounting ("DN-AAA") server.

The ETDF authentication verifies that the UE-ETDF 210 is authentic (e.g., so it can be trusted) and also creates a common ETDF key in the UE-ETDF 210 and in the NW- ETDF 154. The ETDF authentication can be carried out by using any applicable method. As a non-limiting example, the UE-ETDF 210 may be considered authentic if it presents a valid identity certificate.

Following successful ETDF authentication, the NW-ETDF 154 sends a first list of application IDs to the UE-ETDF 210 (see messaging 710). This list includes the applications of which the UE-ETDF 210 is to detect encrypted data flows and then send detection information (e.g., an application key "AppKey") to the 5GC 605. It is expected that, in most scenarios, the 5GC 605 is interested in detecting encrypted data flows associated with certain applications only, and then it would apply the configured policy for these applications. In other scenarios, the 5GC 605 may have a "default" policy that would apply to all encrypted data flows. For example, if the 5GC 605 wants to apply one policy for the encrypted data flows of application "com.example.myapp" and another policy for the encrypted data flows of all other applications, then the first list sent to UE-ETDF would include two application identities: "com.example.myapp" and "com.3gpp.wildcard" (or other suitable special application identity that matches all applications).

Next, the UE-ETDF 210 and the NW-ETDF 154 derive an application key for each application in the first list by using the ETDF key created during the ETDF authentication (see block 715). As an example the application key ("AppKey") of an application may be created by hashing the ETDF key and the Application ID: AppKey=Hash(ETDF key||Application ID).

An application key is a fixed-sized number and small enough (e.g., 16 bits) so it can efficiently be piggybacked in a data packet. In certain embodiments, the application key for each application on the first list is unique. In the depicted example, the AppKey corresponding to the application identifier is the value "0x17A3."

After deriving the application keys for each application in the first list, the NW-ETDF 154 discovers the PCF related to a certain PDU session. For example, the NW-ETDF 154 may use the Nbsf_Management_Discover service operation (defined in 3GPP TS 23.501) to discover the PCF. The NW-ETDF 154 then sends to the PCF the list of application IDs and the AppKey corresponding to each application (see messaging 720). Subsequently, this list of application IDs and corresponding AppKeys is forwarded to a UPF, e.g., via the SMF (see block 725). The UPF then can determine which application is associated with an encrypted data flow by using the AppKey received from the UE 205 and select a traffic policy based on the corresponding application, as discussed in further detail with reference to FIG. 8.

Figure 8:
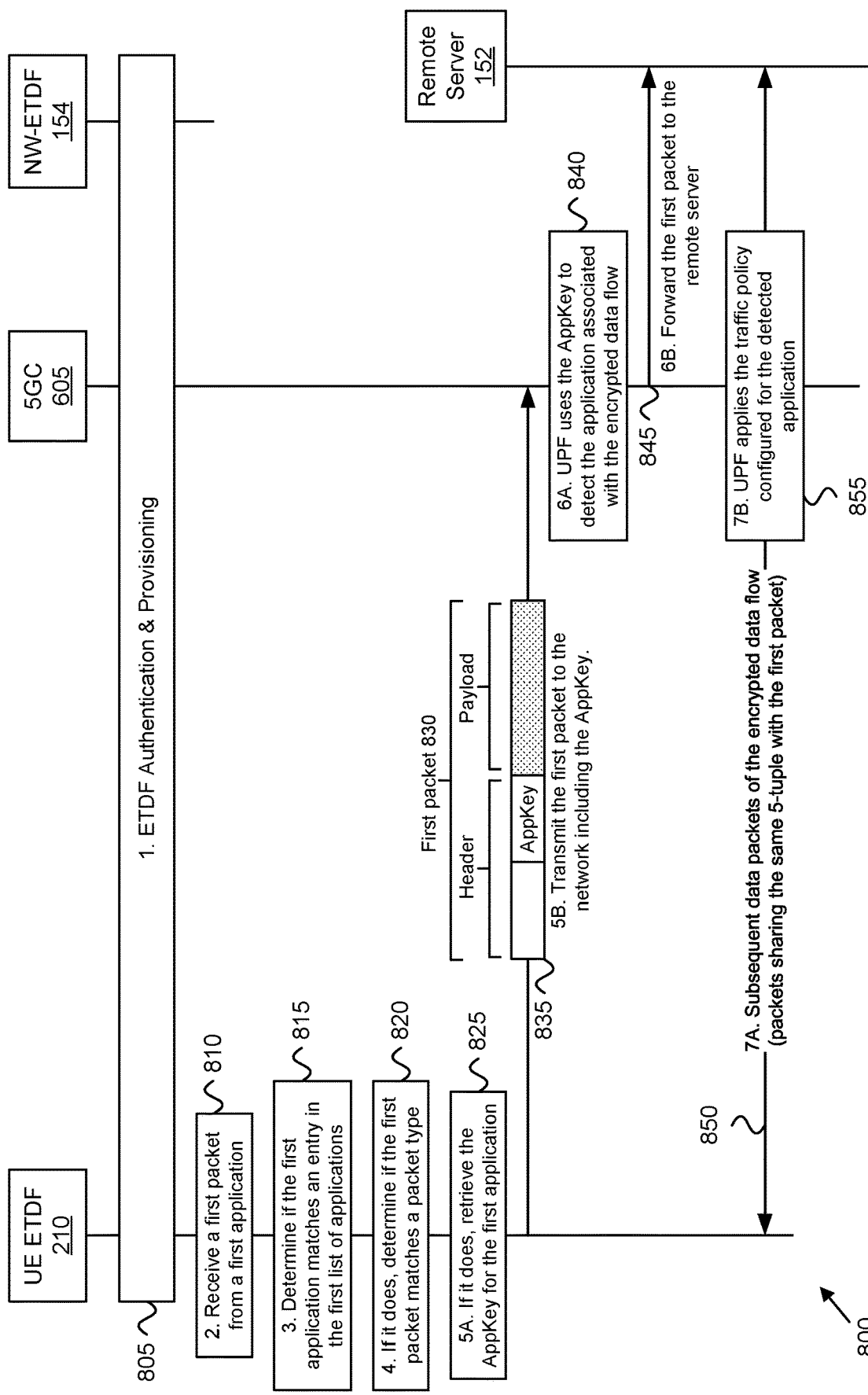
FIG. 8 is a block diagram illustrating one embodiment of a network procedure for encrypted traffic detection.

FIG. 8 depicts a network procedure 800 for encrypted traffic detection, according to embodiments of the disclosure. The network procedure 800 involves the UE-ETDF 210, the 5GC 605, the NW-ETDF 154, and the remote server 152. While depicted as separate from (e.g., external to) the 5GC 605, in other embodiments the procedure is performed with the NW-ETDF 154 being located within the 5GC 605. Note that the UE-ETDF 210 is a part of the UE 205 (not shown).

The network procedure 800 begins as the UE-ETDF 210 and the NW-ETDF 154 perform ETDF authentication and provisioning (see block 805). One example of ETDF authentication and provisioning is described above, with reference to FIG. 7. After the ETDF Authentication and Provisioning is executed, the network can reliably determine an application associated with an encrypted data flow by using "encrypted traffic detection information" (e.g., the AppKey) provided by the UE.

Following the ETDF authentication and provisioning, the UE-ETDF 210 receives a first packet from a first application inside the UE (see block 810). As discussed above with reference to FIG. 2B, the UE-ETDF 210 may be located within a protocol stack of the UE 205, such that data packets generated by the applications running on the UE 205 pass through the UE-ETDF 210.

Having received a data packet, the UE-ETDF 210 determines if the generating application (here, the first application) matches an entry in the list of applications received during ETDF authentication and provisioning (see block 815). A match would exist (i) if the identity of the first application is included in the list, or (ii) if the identity of the first application is not included in the list, but the list includes a "wildcard" application identity (e.g., com.3gpp.wildcard).

If the first application matches an entry in the first list of applications, then the UE-ETDF 210 determines if the first packet matches at least one of a plurality of packet types (see block 820). For example, the UE-ETDF 210 may determine if the first packet is a TCP SYN packet to port '443,' or a TLS 'ClientHello' packet, etc. All these packet types are packets that initiate a new encrypted data flow. To detect a new Secure Sockets Layer ("SSL") and/or TLS encrypted data flow, the UE-ETDF 210 may detect when a new TCP connection to port '443' is initiated, i.e. when a TCP SYN packet to destination port '443' is sent. Alternatively, the UE-ETDF 210 may detect when a new TLS 'ClientHello' message is being sent (which is useful in case the TLS connection is not made on the default port '443').

If the first packet matches at least one of the plurality of packet types, the UE-ETDF 210 then identifies that a new encrypted data flow is starting and that it should provide detection information for this data flow to the 5GC 605. In the depicted embodiment, the detection information is the AppKey corresponding to the application that initiated the data flow. Hence, the UE-ETDF 210 retrieves the AppKey corresponding to the application that initiated the data flow and embeds this AppKey in the first packet (see block 825 and first packet 830). Subsequently, the UE 205 transmits the first data packet to the network including the AppKey (see messaging 835).

As discussed above, the AppKey may be embedded in an IPv6 header (e.g., by using a new IPv6 Extended Header), or in an IPv4 packet (e.g., by using a new Protocol Type), or in a GRE header, etc. The AppKey is constructed as a small number (e.g., 16 bits) that can be easily embedded into the first data packet.

When the UPF in the 5GC 605 receives the first packet 830, it uses the AppKey to identify the application associated with the new encrypted data flow (see block 840). As discussed above, the UPF receives from PCF (via SMF) a list of application ids and their corresponding AppKeys. Finally, the UPF forwards the first packet to its final destination (here, the remote server 152) after removing the AppKey (see messaging 845). If the UPF is provisioned with traffic policy for the detected application, the UPF applies this policy for all the packets of the encrypted data flow (see messaging 850 and block 855). These packets share the same value of 5-tuple (source/destination address, source/destination port, protocol).

Figure 9:
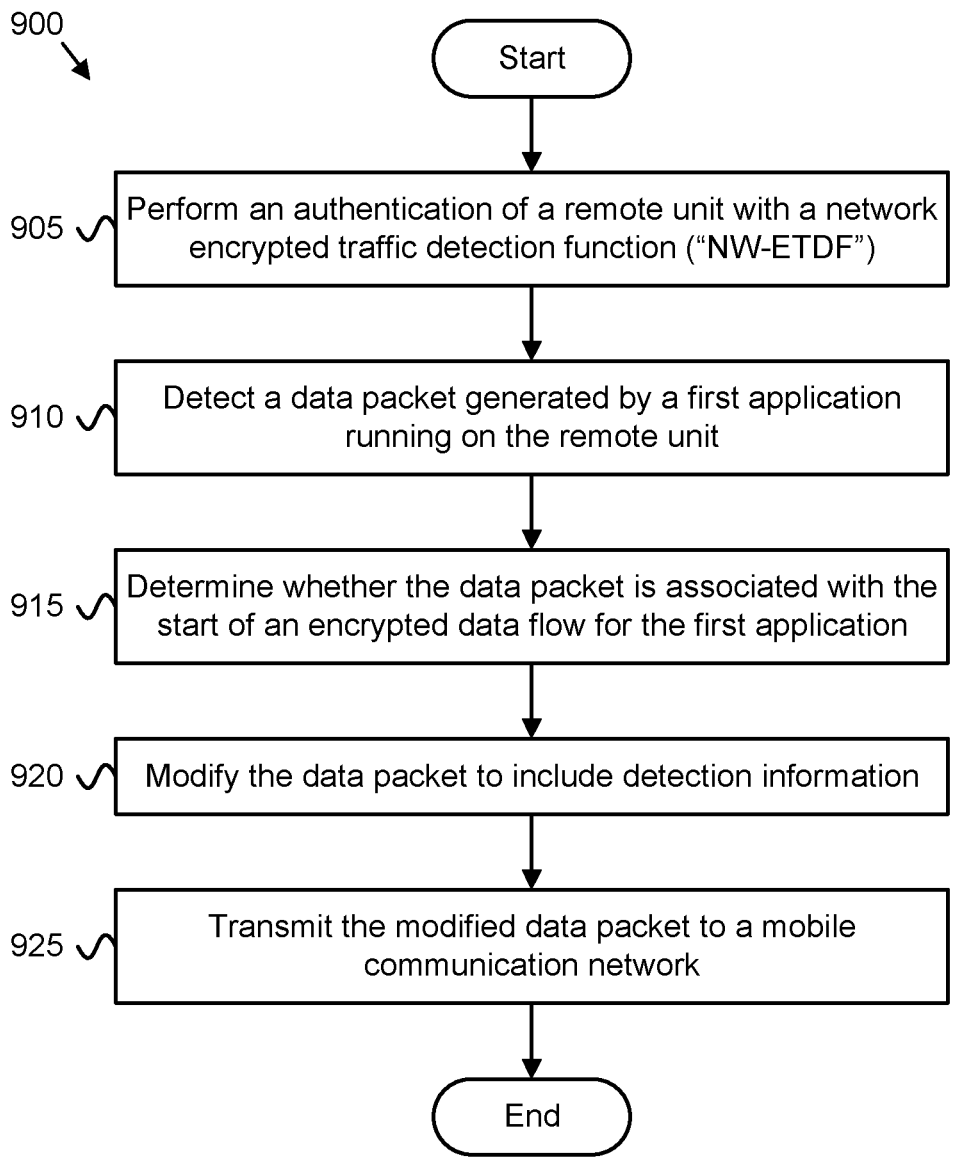
FIG. 9 is a flow chart diagram illustrating one embodiment of a method of a UE for associating the start of an encrypted data flow with an application.

FIG. 9 depicts a method 900 for associating the start of an encrypted data flow with an application, according to embodiments of the disclosure. In some embodiments, the method 900 is performed by an apparatus, such as the remote unit 105, the UE 205, and/or the UE apparatus 300. In certain embodiments, the method 900 may be performed by a processor executing program code, for example, a microcontroller, a microprocessor, a CPU, a GPU, an auxiliary processing unit, a FPGA, or the like.

The method 900 begins with performing 905 an authentication of a remote unit with a network encrypted traffic detection function ("NW-ETDF"). In certain embodiments, performing 905 the authentication includes generating an encrypted traffic detection key after a successful authentication.

The method 900 includes detecting 910 a data packet generated by a first application running on the remote unit. In one embodiment, the first application is a user application running on the remote unit. In another embodiment, the first application is an operating system application running on the remote unit.

The method 900 includes determining 915 whether the data packet is associated with the start of an encrypted data flow for the first application. In various embodiments, determining 915 whether the data packet is associated with the start of an encrypted data flow includes determining whether an application identifier of the first application is included in a list of application identifiers for which encrypted traffic detection information is to be provided, identifying a packet type for the detected data packet in response to the application identifier of the first application being included in the list of application identifiers, and determining whether the packet type matches at least one packet type associated with an encrypted data flow.

In some embodiments, the at least one packet type associated with an encrypted data flow includes one of: a Transmission Control Protocol Synchronize ("TCP SYN") packet with destination port '443,' a Transport Layer Security protocol ("TLS") "ClientHello" packet, and/or a User Datagram Protocol ("UDP") packet to port '80.' In certain embodiments, the list of application identifiers from a network function, such as the NW-ETDF and/or the PCF.

The method 900 includes modifying 920 the data packet to include detection information. In some embodiments, the detection information includes an application key. Here, the application key is formed based on an application identifier of the first application and on the encrypted traffic detection key. Moreover, modifying 920 the data packet to include detection information may include inserting the application key in a header of the data packet and/or encapsulating the data packet. In certain embodiments, modifying 920 the data packet to include detection information includes generating an application key for each application identifier in the list of application identifiers. Here, the detection information includes the application key for the first application.

The method 900 includes transmitting 925 the modified data packet to a mobile communication network. The method 900 ends. As discussed herein, the apparats may further identify one or more additional data packets belonging to the data flow, wherein the one or more additional data packets are sent without the detection information.

Figure 10:
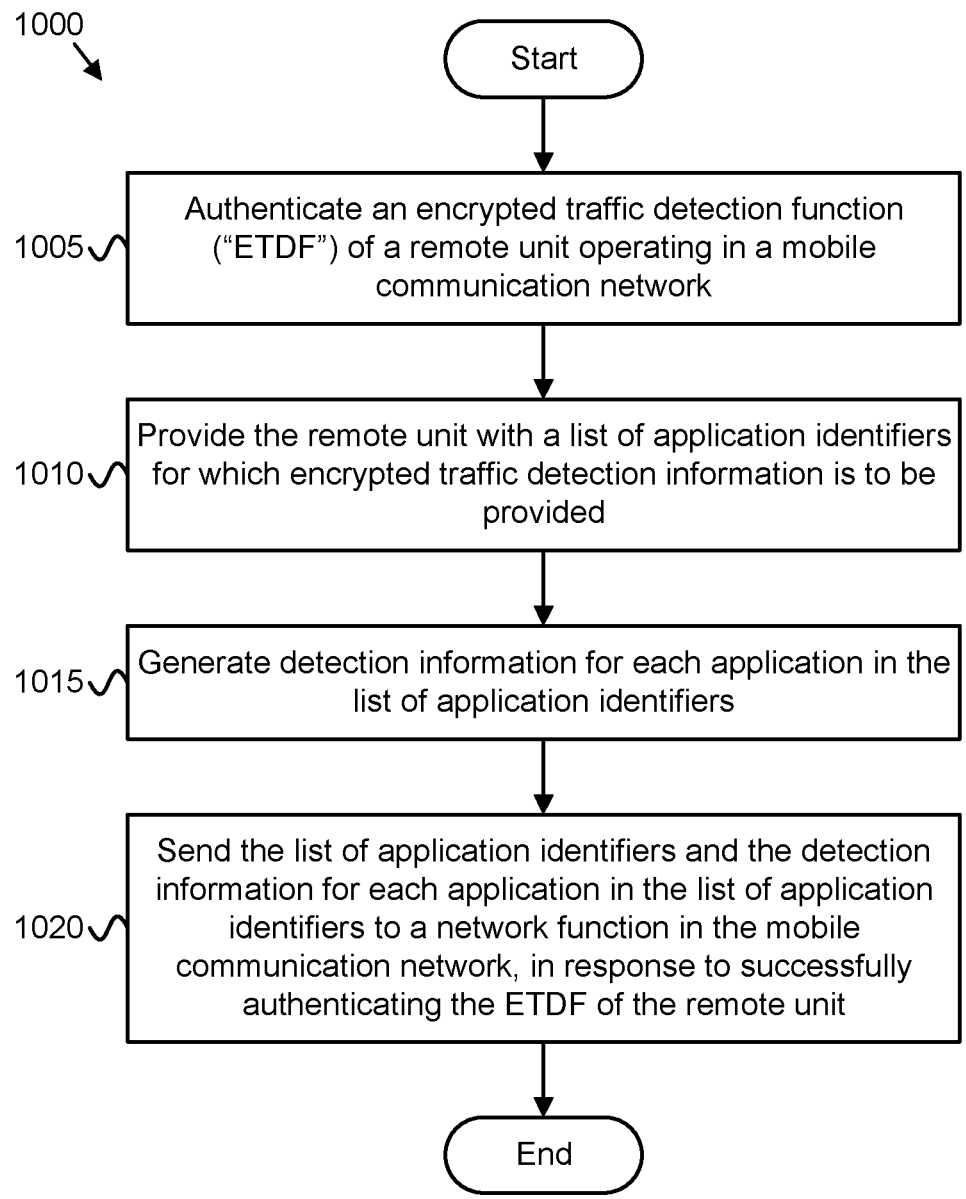
FIG. 10 is a flow chart diagram illustrating one embodiment of a method of network encrypted traffic detection function for associating the start of an encrypted data flow with an application.

FIG. 10 depicts a method 1000 for associating the start of an encrypted data flow with an application, according to embodiments of the disclosure. In some embodiments, the method 1000 is performed by an apparatus, such as the NW-ETDF 154 and/or the encrypted traffic detection apparatus 400. In certain embodiments, the method 1000 may be performed by a processor executing program code, for example, a microcontroller, a microprocessor, a CPU, a GPU, an auxiliary processing unit, a FPGA, or the like.

The method 1000 begins with authenticating 1005 an encrypted traffic detection function ("ETDF") of a remote unit operating in a mobile communication network. In certain embodiments, authenticating 1005 the ETDF includes generating an encrypted traffic detection key after a successful authentication of the ETDF of the remote unit. The method 1000 includes providing 1010 the remote unit with a list of application identifiers for which encrypted traffic detection information is to be provided.

The method 1000 includes generating 1015 detection information for each application in the list of application identifiers. In some embodiments, the detection information comprises an application key unique to each application. Here, generating 1015 detection information includes creating an application key for each application in the list of application identifiers based on an application identifier of each application and on the encrypted traffic detection key. For example, a hash function may be used to generate the application key from the application identifier and the encrypted traffic detection key.

The method 1000 includes sending 1020 the list of application identifiers and the detection information for each application in the list of application identifiers to a network function in the mobile communication network, in response to successfully authenticating the ETDF of the remote unit. The method 1000 ends.

Figure 11:
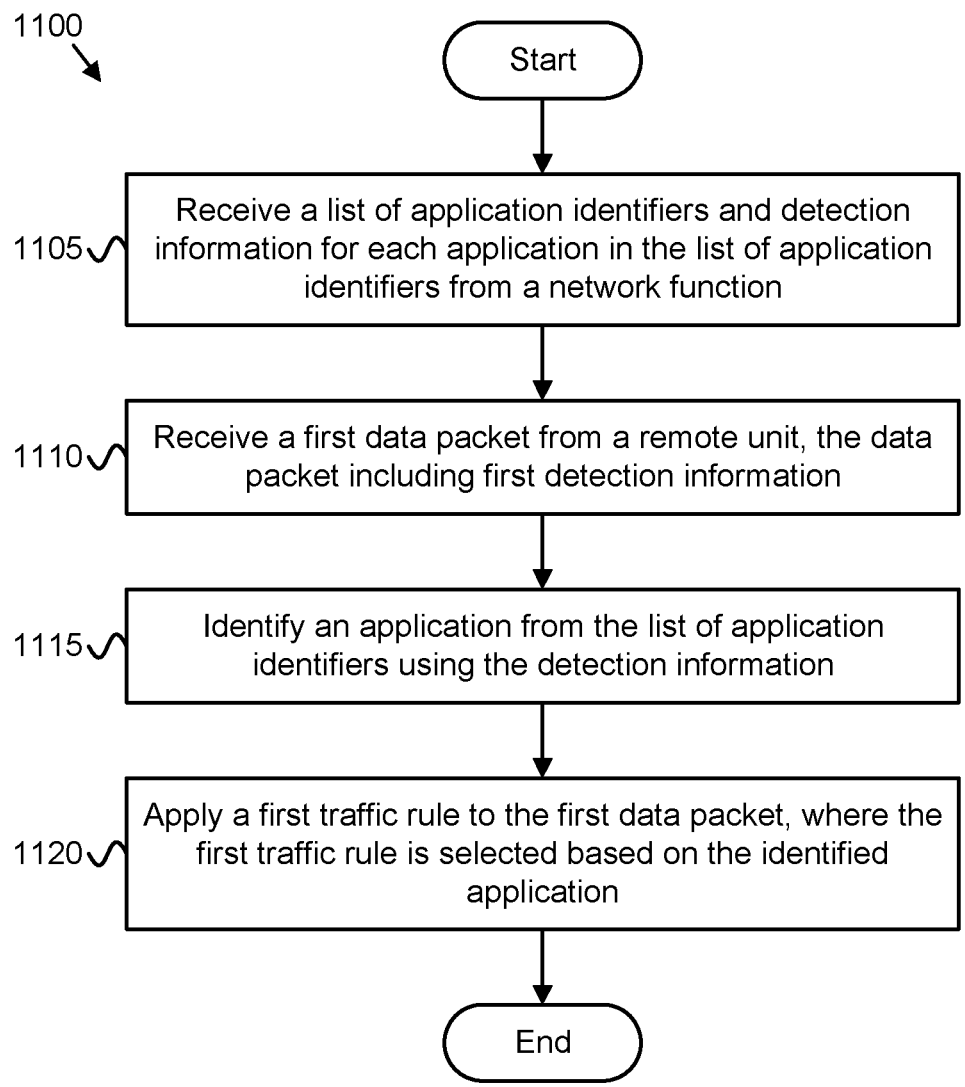
FIG. 11 is a flow chart diagram illustrating one embodiment of a method of a network function for associating the start of an encrypted data flow with an application.

FIG. 11 depicts a method 1100 for associating the start of an encrypted data flow with an application, according to embodiments of the disclosure. In some embodiments, the method 1100 is performed by an apparatus, such as the UPF 141 and/or the network function apparatus 500. In certain embodiments, the method 1100 may be performed by a processor executing program code, for example, a microcontroller, a microprocessor, a CPU, a GPU, an auxiliary processing unit, a FPGA, or the like.

The method 1100 begins with receiving 1105 a list of application identifiers and detection information for each application in the list of application identifiers from a network function. In some embodiments, the detection information may comprise application keys for each application identifier in the list of application identifiers. In certain embodiments, the list of application identifiers and the detection information is received from a session management function in a mobile core network.

The method 1100 includes receiving 1110 a first data packet from a remote unit, the data packet including first detection information. In various embodiments, the first detection information comprises a first application key corresponding to a first application running on the remote unit. The method 1100 includes identifying 1115 an application from the list of application identifiers using the detection information.

The method 1100 includes applying 1120 a first traffic rule to the first data packet, where the first traffic rule is selected based on the identified application. The method 1100 ends. In some embodiments, applying 1120 the first traffic rule to the first data packet includes receiving a plurality of traffic rules from the network function, each traffic rule being associated with one or more applications. Here, applying 1120 the first traffic rule to the first data packet comprises selecting a traffic rule associated with the identified application and applying the selected traffic rule to the first data packet.

As discussed above, one or more subsequent data packets may be received which are encrypted and do not include detection information. Here, the first traffic rule will be applied to the subsequent data packets associated with the first data packet.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM") (or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a memory; and
a processor coupled with the memory and configured to cause the apparatus to:
receive, from a user equipment ("UE"), a message to initiate an authentication procedure;
authenticate an encrypted traffic detection function ("ETDF") associated with the UE using the authentication procedure;
determine a list of application identifiers for which encrypted traffic detection information is to be provided, based on a result of the authentication procedure, wherein each application identifier in the list of application identifiers corresponds to a respective application of a list of applications;
generate detection information for each application in-associated with the list of application identifiers; and
send the list of application identifiers and the detection information for each application associated with the list of application identifiers to a network function in a mobile communication network.

2. The apparatus of claim 1, wherein the detection information comprises an application key unique to each application associated with the list of application identifiers.

3. The apparatus of claim 2, wherein to generate the detection information for each application associated with the list of application identifiers, the processor is configured to cause the apparatus to create a respective application key for each respective application using at least one of a respective application identifier of the respective application and an ETDF key.

4. The apparatus of claim 3, wherein the processor is further configured to cause the apparatus to generate the ETDF key in response to a successful result of the authentication procedure.

5. The apparatus of claim 3, wherein to create the respective application key, the processor is configured to cause the apparatus to hash the ETDF key and the respective application identifier.

6. The apparatus of claim 2, wherein the application key is a fixed size, and wherein the fixed size is less than or equal to 16 bits.

7. The apparatus of claim 1, wherein the message indicates a data connection associated with the UE, and wherein the processor is further configured to cause the apparatus to discover a policy control function ("PCF") associated with the data connection.

8. The apparatus of claim 7, wherein the data connection comprises a Protocol Data Unit ("PDU") session, and wherein the network function comprises the PCF.

9. The apparatus of claim 1, wherein the list of application identifiers indicates a set of applications for which encrypted data flows are to be detected.

10. The apparatus of claim 1, wherein the list of application identifiers comprises a catch-all entry that matches all applications.

11. A method comprising:
receiving, from a user equipment ("UE"), a message to initiate an authentication procedure;
authenticating an encrypted traffic detection function ("ETDF") associated with the UE using the authentication procedure;
determining a list of application identifiers for which encrypted traffic detection information, based on a result of the authentication procedure, wherein each application identifier in the list of application identifiers corresponds to a respective application of a list of applications;
generating detection information for each application associated with the list of application identifiers; and
sending the list of application identifiers and the detection information for each application associated with the list of application identifiers to a network node in a mobile communication network.

12. The method of claim 11, wherein the detection information comprises an application key unique to each application associated with the list of application identifiers.

13. The method of claim 12, wherein to generate the detection information for each application associated with the list of application identifiers, the method further comprises creating a respective application key for each respective application using at least one of a respective application identifier of the respective application and an ETDF key.

14. The method of claim 13, further comprising generating the ETDF key in response to a successful result of the authentication procedure.

15. The method of claim 13, wherein creating the respective application key comprises hashing the ETDF key and the respective application identifier.

16. The method of claim 12, wherein the application key is a fixed size, and wherein the fixed size is less than or equal to 16 bits.

17. The method of claim 11, wherein the message indicates a data connection associated with the UE, the method further comprising discovering a policy control function ("PCF") associated with the data connection.

18. The method of claim 17, wherein the data connection comprises a Protocol Data Unit ("PDU") session, and wherein the network node comprises the PCF.

19. The method of claim 11, wherein the list of application identifiers indicates a set of applications for which encrypted data flows are to be detected.

20. The method of claim 11, wherein the list of application identifiers comprises a catch-all entry that matches all applications.

* * * * *